United States Patent

Howard

[15] 3,660,670

[45] May 2, 1972

[54] DOCUMENT DETECTING AND COUNTING APPARATUS

[72] Inventor: Dwight Thomas Howard, Rochester, N.Y.

[73] Assignee: Eastman Kodak Company, Rochester, N.Y.

[22] Filed: Dec. 21, 1970

[21] Appl. No.: 99,866

[52] U.S. Cl. .........................250/219 DC, 250/206, 250/222

[51] Int. Cl. ........................................................G01n 21/30

[58] Field of Search..............250/219 DC, 219 LG, 219 WD, 250/219 DQ, 206, 214 R, 221, 222, 222 PC, 223

[56] References Cited

UNITED STATES PATENTS

| | | | |
|---|---|---|---|
| 2,570,442 | 10/1951 | Grosdoff | 250/214 R X |
| 3,321,637 | 5/1967 | Beltz et al. | 250/219 DC X |
| 3,329,821 | 7/1967 | Lesage | 250/206 |
| 3,355,592 | 11/1967 | Muir | 250/223 R X |
| 3,400,270 | 9/1968 | Durig | 250/206 |
| 3,424,908 | 1/1969 | Sitter | 250/214 R UX |
| 3,461,303 | 8/1969 | Hanson | 250/219 DC |

*Primary Examiner*—Stanley T. Krawczewicz
*Attorney*—Robert W. Hampton and Raymond L. Owens

[57] ABSTRACT

Apparatus is disclosed for detecting and counting the number of documents which move into a predetermined location along a path. The apparatus includes a photosensitive device disposed adjacent the predetermined location and adapted to receive incident illumination at a first level of brightness when a document is absent from the location and at reduced brightness level when the document moves into the location. The photosensitive device has a parameter, the magnitude of which varies as a function of the brightness level of incident illumination. The apparatus further includes a first amplifier stage which is electrically coupled to the photosensitive device, and is adapted to produce and store a first reference voltage at a level which is a function of the level of brightness of incident illumination received by the photosensitive device when the document is absent from the predetermined location; and a second amplifier stage adapted to produce a second reference voltage at a level which is a function of the instantaneous brightness level of illumination incident on the photosensitive device. The apparatus further includes an operational amplifier which produces an output which is a function of variations between the levels of the reference voltages, and a high pass filter which is coupled to the operational amplifier and adapted to produce a pulse when a document moves into the predetermined location, and a counter which in response to each pulse keeps a record of the number of documents which have moved past the predetermined location.

5 Claims, 1 Drawing Figure

PATENTED MAY 2 1972 3,660,670
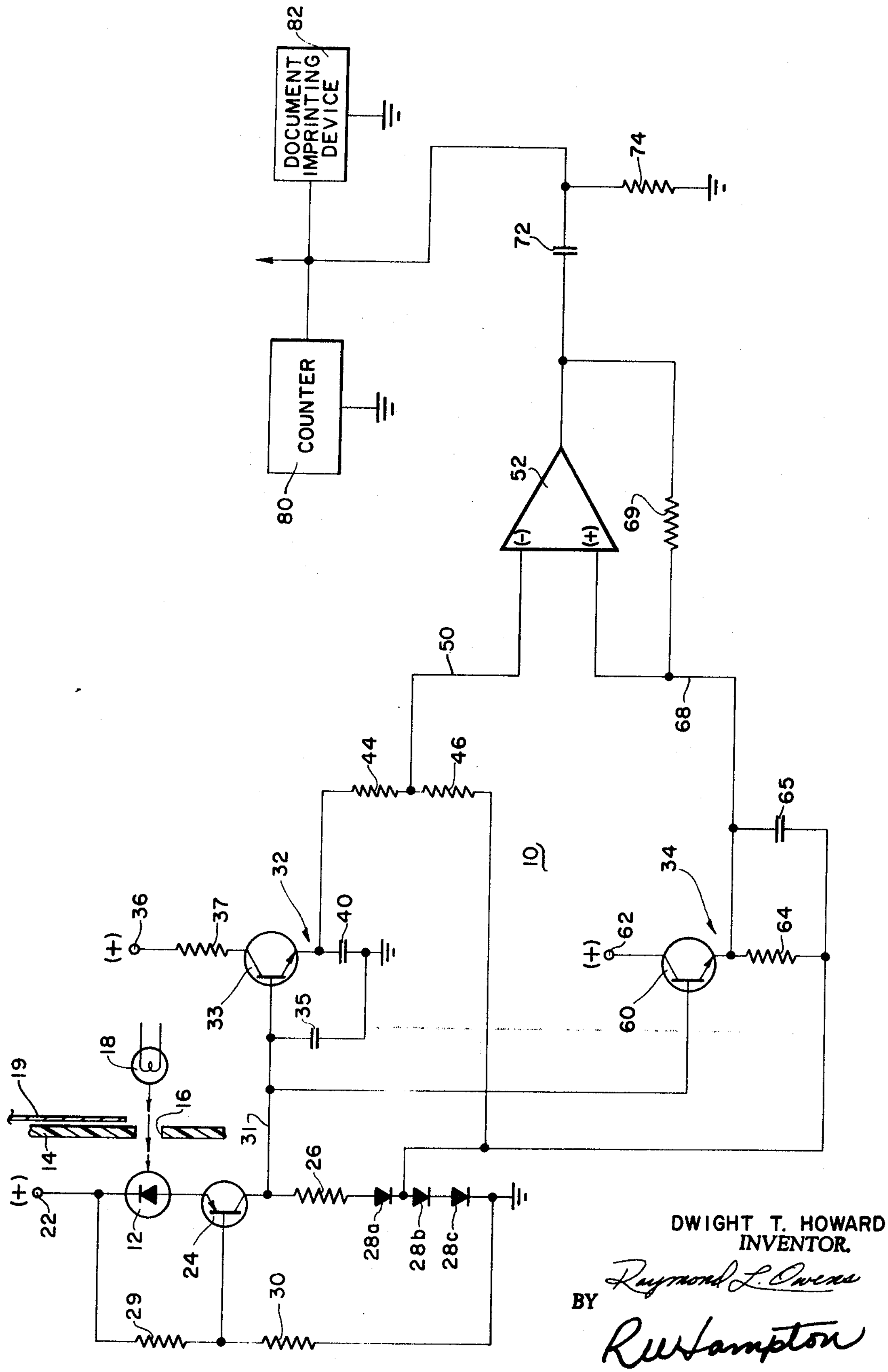
DWIGHT T. HOWARD
INVENTOR.
BY Raymond L. Owens
R. W. Hampton
ATTORNEYS

DOCUMENT DETECTING AND COUNTING APPARATUS

BACKGROUND OF THE INVENTION

The present invention relates to apparatus for detecting and counting the number of items such as documents which move past a predetermined location.

In a number of applications such as microfilmers, document detectors are employed for counting documents and initiating machine functions such as the energization of exposure lamps, and the opening and closing of a shutter. Conventional document detecting apparatus employ a photocell adapted to produce an output signal which varies when a document moves between the photocell and a source of light which normally illuminates the photocell. The apparatus includes a comparator which compares the photocell output signal against a predetermined threshold level to determine if the document is present. These arrangements are subject to certain limitations such as, for example, the predetermined threshold level may have to be periodically adjusted. One reason for this is that over a period of time the response to photosensitive devices may vary due to aging or other effects, such as dust accumulation.

In U.S. Pat. No. 3,189,745 to Van Reymersdal and U.S. Pat. No. 3,461,303 to Handon, apparatus are disclosed which detected perforations in a punched card and do not employ predetermined threshold levels. These apparatus employ the technique of comparing two signals, the first being a function of the brightness under maximum illumination of a photocell (viz. no card present), and the second being a function of the instantaneous brightness of illumination incident on the photocell.

SUMMARY OF THE INVENTION

It is an object of the invention to provide improved apparatus for detecting the absence or presence of an item such as a document and for counting the number of items which move past a predetermined location.

A further object of the present invention is to provide a document detection apparatus which obviates the need for employing fixed threshold comparison techniques.

A still further object of the present invention is to provide a document detection apparatus which minimizes the effects of variations in the operating characteristics of a document detection photosensitive device.

In accordance with one preferred embodiment of the invention, there is provided a document detecting and counting apparatus which includes photosensitive means disposed at a predetermined location for receiving incident illumination at a first brightness level when a document is absent, and at decreased brightness when the document moves into the predetermined location. The photosensitive means has a parameter, the magnitude of which varies as a function of the brightness level of illumination incident on the photosensitive means. The apparatus further includes a first amplifier stage which is adapted to produce and then store a first reference voltage having a level which is a function of the level of brightness of incident illumination in the absence of the document, a second amplifier stage which is adapted to develop a second reference voltage which is a function of the instantaneous level of brightness of illumination incident on the photosensitive means, means including a high pass filter, responsive to variations in the difference between the levels of the first and second reference voltages to produce an output pulse type signal indicative of the presence of a document at the predetermined location, and a counter response to each pulse signal for providing an indication of the number of documents which have moved past the predetermined location.

BRIEF DESCRIPTION OF THE DRAWING

The above and other objects and advantages of the present invention will become apparent to one skilled in the art from the following detailed description read in conjunction with the attached drawing which is a schematic diagram of a document detecting and counting apparatus in accordance with the present invention.

DESCRIPTION OF THE PREFERRED EMBODIMENT

Referring to the drawing, there is shown the general arrangement of a document detecting and counting apparatus 10 which includes: a photosensitive means comprising a photocell 12 which preferably may be a photovoltaic device such as International Rectifier cell No. SO520E6 operated in a current generation mode (viz. generates current as a function of the brightness of incident illumination) or alternatively may be a photo diode which has a variable resistance parameter, positioned at a sensing station 13 disposed in a predetermined location in a machine such as a microfilmer. A document 19 is advanced, by document advancing apparatus (not shown) which may take various forms well known to those skilled in the art, along a predetermined path, shown partially by arrows, to a photographic unit (not shown).

Referring more specifically to the sensing station, the machine includes a guide wall 14 for supporting the document and having an opening 16. In "line-of-sight" alignment on opposite sides of the opening 16 are the photocell 12 and a light source 18 for illuminating the photocell 12. The photocell 12 has an electrical parameter, namely current which varies directly with the level of brightness of incident illumination. Prior to a document 19 reaching the sensing station, the light source 18 fully illuminates the photocell 12; but as the document moves into the station, the intensity of the level of brightness of incident illumination on the photocell 12 is reduced as the document moves in front of the opening 16 and begins to obstruct the line of sight path between the light source 18 and the photocell 12. When the document fully covers the opening 16, the brightness level of incident illumination is still further reduced to a level which depends upon the transparency of the document.

One terminal of the photocell 12 is connected to a source of positive potential represented by the terminal 22. The other terminal of the photocell is connected directly to the emitter electrode of a PNP transistor 24. The collector of transistor 24 is connected to ground via a load resistor 26 serially connected to three diodes 28*a*, *b*, and *c*. Across the diodes 28*b* and *c* is a potential drop used for providing bias for active elements in amplifier stages to be described, rather than having a connection directly to ground. Throughout this specification, whenever the term voltage is used, it is to be understood to be taken with respect to ground. The base electrode of the transistor 24 is connected at the electrical junction of resistors 29 and 30 which are respectively connected to the terminal 22 and ground. The transistor 24 is biased so that it is normally in an active mode of operation. When no document is present at the station, the photocell 12 will receive incident illumination at a maximum level of brightness and the magnitude of the current through it will be at its lowest level. Conversely, when a document is moved into the station and partially covers the opening 16 to a point where level of brightness of incident illumination on the photocell 12 will be materially reduced, the magnitude of the current flowing through the photocell will rapidly increase. As will be seen, it is at this time that the apparatus 10 will produce an output pulse indicating the presence of the document 19 at the sensing station.

At the junction of the collector electrode of the transistor 24 and the load resistor 26, a voltage is developed which will be at a high level when the photocell is fully illuminated, and at a lower level as the document 19 moves before the opening 16. A lead 31 is connected at this junction and connected to a first amplifier stage 32 and a second amplifier stage 34.

The first amplifier stage 32 includes an NPN transistor 33 biased to operate in the active region and having its base electrode connected to the lead 31 and also connected to ground via a capacitor 35 which couples spurious high frequency signals to ground. The collector electrode is connected by way of a resistor 37 to a source of positive potential represented by the terminal 36. The emitter electrode of the transistor 33 is coupled to ground by a capacitor 40 selected to have a capacitance such that in the circuit it has a relatively long discharge time constant. It should be noted that a document will be present at the sensing station for a relatively short time period. Consequently, a voltage will be produced and maintained across the capacitor 40 which is a function of the magnitude of the current flowing through the photocell 12 when the photocell 12 is fully illuminated, since the time elapsed when the document covers the opening 16 will not be long enough to permit a significant loss of charge on the capacitor 40. Viewed differently, as a document moves before and finally covers the opening 16, the voltage across the capacitor 40 will vary only slightly from its level when the photocell 12 was fully illuminated inasmuch as the capacitor 40 will retain most of its charge. At the junction of the capacitor 40 and the emitter electrode of the transistor 33, a voltage divider network comprising resistances 44 and 46 is connected to ground via diodes 28*b* and *c*. At the junction of the resistors 44 and 46, there is provided a lead 50 which couples first reference voltage to an operational amplifier 52. The first reference voltage is proportional to the voltage across the capacitor 40, and therefore, is a function of the magnitude of the current flowing through the photocell 12 when fully illuminated.

The amplifier stage 34 is adapted to produce a signal, the level of which is a function of the instantaneous magnitude of the parameter of the photocell 12. Towards this end, the second amplifier stage 34 is in an emitter-follower configuration and includes an NPN transistor 60 biased to operate in the active region and having its base electrode coupled to the junction of the load resistor 26 and the collector electrode of the transistor 24. The collector electrode of the transistor 60 is connected to a source of positive potential shown by a terminal 62, and its emitter electrode is connected via a resistor 64 to the junction of the diodes 28*a* and *b*. A capacitor 65 is connected in parallel across the resistor 64. A second reference voltage at the junction of the resistor 64 and the transistor 60 is coupled by a lead 68 to the operational amplifier 52. The level of the second reference voltage level is a function of the instantaneous magnitude of the resistance parameter of the photocell 12.

The operational amplifier 52 includes a positive feedback resistor 69 which provides the amplifier 52 with some hysteresis. The amplifier 52 normally has a constant level or steady stage DC output voltage; however, when there is a substantial variation between the input reference voltages, a rapid decrease occurs in the output signal. The situation occurs only as a document moves before the opening 16 and the current flowing through the photocell 12 is materially increased. A high pass filter comprised of a capacitor 70 and a resistor 74 is coupled to the output of the operational amplifier and produces a sharp negative trigger output pulse to a device (not shown) such as a document counter indicating the presence of a document at the sensing station. The capacitance of the capacitor 72 is selected at a low level so that any relatively slow variations in any of the circuit parameters such as the resistance parameter of the photocell 12 will not produce a usable output pulse from the high pass filter. It should be noted that the high pass filter will produce only a single usable output pulse as a document moves before the opening 16 and will not respond to a further increase in the resistance of the photocell 12 which occurs when the document completely covers the opening 16 coupled directly to the output of the high pass filter is a counter 80, which in response to each pulse and keeps an accurate counter of each pulse (which corresponds to the number of documents which pass by the sensing station). A document imprinting device 82 also is coupled to the output of the high pass filter and in response to each pulse causes the next number or letter of a series to be imprinted on the document before it is advanced into the photographic unit.

Summarizing, the apparatus 10 recognizes the presence of a document at the sensing station by producing a pulse at the output of a high pass filter and the number of documents which have sequentially been recognized is recorded by the counter 80.

The invention has been described in detail with particular reference to a preferred embodiment thereof, but it will be understood that variations and modifications can be effected within the spirit and scope of the invention.

I claim:

1. In apparatus for detecting and counting the number of documents which sequentially advance along a predetermined path and move into a predetermined location along the path, the combination comprising:

a. photosensitive means disposed adjacent the predetermined location and adapted to receive incident illumination at a first level of brightness when the document is absent from the predetermined location, and at another brightness level when the document moves into the predetermined location, said photosensitive means having a parameter which varies as a function of the level of brightness of incident illumination;

b. a first amplifier stage coupled to said photosensitive means and adapted to produce a first signal having a level related in magnitude to the magnitude of the parameter of said photosensitive means when said photosensitive means receives illumination at the first brightness level;

c. a second amplifier stage coupled to said photosensitive means and adapted to produce a second signal having a level which is a function of the instantaneous magnitude of the parameter of said photosensitive means;

d. means responsive to the first and second signals for producing a third signal which is a function of variations in the difference between the levels of the first and second signals;

e. means responsive to the third signal for producing an output pulse signal indicative of the presence of the document at the predetermined location; and f. counter means responsive to each pulse signal for recording the number of documents which have moved into the predetermined location.

2. The invention as set forth in claim 1 wherein said first amplifier stage includes a capacitor adapted to be charged to a level which is a function of the magnitude of the parameter of said photosensitive means when said photosensitive means receives illumination at the first brightness level.

3. The invention as set forth in claim 2 wherein said third signal producing means includes an operational amplifier for producing the third signal.

4. The invention as set forth in claim 2 wherein said output signal producing means includes a high pass filter circuit responsive to the third signal and adapted to produce the output signal in the form of a pulse.

5. In apparatus for detecting and counting the number of documents which sequentially advance along a predetermined path and move into a predetermined location along the path, the combination comprising:

a. a photocell disposed adjacent the predetermined location and adapted to receive incident illumination at a first level of brightness when the document is absent from the predetermined location and at another brightness level when the document moves into the predetermined location, said photocell having a parameter which varies as a function of the level of brightness of incident illumination;

b. a first amplifier stage electrically coupled to said photocell and having a capacitor and adapted to produce and maintain a first reference voltage across said capacitor having a level which is a function of the magnitude of the parameter of said photocell when said photocell receives illumination at the first brightness level;

c. a second amplifier stage in an emitter-follower configuration and adapted to produce a second reference voltage having a level which is a function of the instantaneous magnitude of the parameter of said photocell;

d. an operational amplifier responsive to said first and second reference voltages for producing a third signal which is a function of variations in the difference between the levels of said first and second voltages;

e. a high pass filter coupled to said operational amplifier and responsive to said third signal for producing an output trigger pulse when the document moves into the predetermined location; and f. counter means responsive to each pulse signal for recording the number of documents which have moved into the predetermined location.

* * * * *